United States Patent

Lohr, Jr. et al.

[15] 3,673,269

[45] June 27, 1972

[54] CHLORINATIVE DEHYDROGENATION OF HYDROCARBONS

[72] Inventors: Delmar Frederick Lohr, Jr., Bedford Heights; Grant Crane; Edward L. Kay, both of Akron, all of Ohio

[73] Assignee: The Firestone Tire & Rubber Company, Akron, Ohio

[22] Filed: Sept. 16, 1970

[21] Appl. No.: 73,258

Related U.S. Application Data

[63] Continuation-in-part of Ser. No. 883,259, Dec. 8, 1969, abandoned.

[52] U.S. Cl.....................................260/677 XA, 260/683.3
[51] Int. Cl.........................................................C07c 11/02
[58] Field of Search............................260/677, 680 D, 683.3

[56] References Cited

UNITED STATES PATENTS

| | | | |
|---|---|---|---|
| 3,383,429 | 5/1968 | Noddings | 260/669 |
| 2,456,367 | 12/1948 | Britton et al. | 252/228.2 |
| 2,456,368 | 12/1948 | Britton et al. | 252/228.2 |
| 3,308,198 | 3/1967 | Bajars | 260/680 |
| 3,173,962 | 3/1965 | Carroll et al. | 260/659 |

OTHER PUBLICATIONS

Britton et al. III Ind. & Engr. Chem., Vol. 43 (1951), pp. 2871–2874.

*Primary Examiner*—Delbert E. Gantz
*Assistant Examiner*—J. M. Nelson
*Attorney*—S. M. Clark and Gordon B. Seward

[57] ABSTRACT

Aliphatic hydrocarbons of from four to six carbon atoms are dehydrogenated by passing the hydrocarbons and chlorine through a reaction zone containing a catalyst of calcium-nickel phosphate, promoted with a minor amount of chromia, at a temperature of from 450° to 675° C.

6 Claims, No Drawings

CHLORINATIVE DEHYDROGENATION OF HYDROCARBONS

CROSS-REFERENCE TO RELATED APPLICATION

This application is a continuation-in-part of our copending application Ser. No. 883,259, filed Dec. 8, 1969, entitled "Chlorinative Dehydrogenation of Hydrocarbons" now abandoned.

BACKGROUND OF THE INVENTION

This invention relates to the gas-phase dehydrogenation of hydrocarbons to the corresponding olefins, diolefins, actylenes or triolefins.

In the production of unsaturated hydrocarbons, useful as polymerizable monomers in the manufacture of plastics and elastomers, a number of processes have been employed. One such process employs a suitable catalyst to convert a substantial proportion of a principally paraffinic feed to the corresponding mono-olefins, with hydrogen as a by-product. Oxidative dehydrogenation processes utilize oxygen in the feed, and yield water vapor as a by-product. The inclusion of halogen, along with oxygen, in the feed has also been disclosed.

In all of these known processes a principal aim is to obtain as high as possible conversion of the feed material, with a maximum proportion of the effluent appearing as the desired unsaturated hydrocarbons, and a minimum amount of unwanted by-products. Thus a need exists for a system which would produce a high conversion of the saturated starting materials, with a correspondingly high selectivity to olefinic or diolefinic products. Selection of the combination of a process and a catalyst system which act together to produce optimum results is of prime importance to investigators in the field of petrochemicals.

U. S. Pat. No. 2,456,367 discloses a catalyst which is essentially calcium-nickel phosphate. This catalyst is described as being effective in the dehydrogenation of olefins to the corresponding diolefins. The feed materials are restricted to olefins, however, and yields are not particularly high. Moreover, the process does not employ a co-reactant material, such as oxygen or a halogen.

SUMMARY OF THE INVENTION

The process of the invention presents a means for dehydrogenating hydrocarbons with improved conversion and selectivity to the desired unsaturated hydrocarbons.

In essence, the invention is carried out by passing a mixture of the hydrocarbon feed, together with from 0.1 to 2.0 moles of chlorine per mole of hydrocarbon at a temperature of from about 450° to about 675° C. and at approximately atmospheric pressure in contact with a calcium-nickel phosphate catalyst, to obtain the corresponding hydrocarbon having the same number of carbon atoms and a greater degree of unsaturation.

The hydrocarbon feed material of the invention is selected from straight chain or branched chain paraffins of from four to six carbon atoms, monoolefins or diolefins of from four to six carbon atoms, or mixtures thereof. Examples of feed materials are n-butane, n-pentane, n-hexane, isobutane, 2-methyl butane(isopentane), butene-1, cis-butene-2, trans-butene-2, 2-methyl-butene-3, 2-methyl-butene-1 and mixtures thereof. Refinery by-products consisting of a mixture of four-carbon compounds are a typical feed stock.

The chlorine fed into the reaction will react primarily to give HCl, and will also produce various chlorinated hydrocarbons, to a lesser degree. The reaction is designed to produce unsaturated hydrocarbons, principally, and the production of chlorinated hydrocarbons is desirably kept to a minimum. The amount of chlorine used can vary from 0.1 to 2.0 moles of chlorine per mole of hydrocarbon feed, and will preferably be from about 0.5 moles to 1.5 moles per mole of hydrocarbon. In general, higher ratios of chlorine will produce a greater degree of unsaturation in the products, but may also produce an increased amount of chlorinated hydrocarbons.

A diluent material can also be used such as nitrogen or steam, or both. Air can be used as a source of nitrogen if desired, although the process works well without the presence of oxygen. Steam is especially advantageous, as it may be easily condensed out of the product stream. From about 5 to about 35 moles of steam per mole of feed hydrocarbon can be used advantageously. The use of from 0 to about 4 moles of nitrogen per mole of hydrocarbon feed may be desirable from a handling standpoint, but is not essential to the process.

The reaction zone may be of any convenient design which gives good contact between the catalyst and the gaseous mixture passing through. Any of a number of commercial reactors may be advantageously employed.

The catalyst of the invention is essentially calcium-nickel phosphate; the characteristics and preparation of this material are described in detail in U. S. Pat. No. 2,456,367. As is indicated in the cited patent, the catalyst may advantageously be prepared in pellet form, so as to be particularly useful in fixed-bed reactors.

While the cited reference states (col. 7, lines 51,52) that the catalyst is susceptible to poisoning by halogens, it was surprisingly found that its use in the process of the invention was not impaired by the use of substantial quantities of a halogen, namely chlorine.

As a promoter, a minor amount of chromia included with the calcium-nickel phosphate has been included, giving improved results in dehydrogenation reactions such as disclosed in U. S. Pat. No. 2,456,367.

In operation, the mixture of feed hydrocarbons, chlorine, and optionally diluent materials can be passed through a preheating manifold in which the mixture is raised to a preheat temperature of from 200° to 300° C. This step is not essential, but is helpful in that the reactants arrive at the reaction zone at a temperature close to that employed in the zone itself, and the reaction temperature can be better controlled.

The preferred temperature of the invention for the reaction zone is from about 450° C. to about 675° C., and the reactor can be jacketed to provide for heat input or removal to maintain this optimum range.

The effluent gas leaving the reaction zone is treated to separate it into its components. Water vapor is condensed out by cooling, and the unreacted chlorine and by-product HCl are recovered. The chlorine can be recycled, and the HCl can be oxidized to chlorine, which in turn can also be recycled into the reaction zone. The remaining gaseous products can be separated by fractionation if desired, or further processed in their mixed state.

The unsaturated hydrocarbon products of the invention find many uses as chemical intermediates or as polymerization monomers. By-product materials can be recycled, or recovered and used. The chlorinated hydrocarbons, while not the desired products of this invention, may also be used as polymerization monomers or chemical intermediates, with or without separating the mixture of chlorinated hydrocarbons into its components.

PREFERRED EMBODIMENTS OF THE INVENTION

The following examples are presented as illustrative of preferred methods of practicing the process of the invention.

EXAMPLE I

A series of trials was performed employing a heated tubular reactor, with various pelletized materials in a fixed reaction bed, as well as with an empty reactor. Analysis of the product was made with an in-line gas chromatograph. The incoming gases were preheated to 200°–300° C., and the reactor was maintained at an average temperature of about 550° C. throughout the trials.

Proportions of the various incoming and effluent gases are expressed as relative gaseous hourly space velocities (GHSV), defined as the volumes of material passed through the reactor (corrected to standard temperature and pressure) per hour, divided by the volume of the reactor. The differing GHSV's reflect the use of different reactor volumes; the flow of the feed hydrocarbon material (butane) was essentially the same in all runs. Pressure in the reactor was atmospheric, or slightly above. Measurements are summarized in the following table, showing improved selectivity to butenes and butadiene (BD), and reduced amounts of chlorinated products with the catalyst of the invention.

TABLE I

| Run Number | GHSV | | | | Conversion | Selectivity | | | Chlorinated cpds- |
|---|---|---|---|---|---|---|---|---|---|
| | Butane | N₂ | Cl₂ | Steam | | Butenes | BD | Total | |
| Empty reactor: | | | | | | | | | |
| 1 | 52 | 178 | 52 | 1,050 | 82 | 51 | 12 | 63 | 20 |
| 2 | 51 | 178 | 63 | 1,030 | 89 | 42 | 15 | 57 | 29 |
| Silica pellets: | | | | | | | | | |
| 3 | 67 | 260 | 75 | 1,500 | 74 | 54 | 23 | 77 | 8 |
| 4 | 72 | 260 | 140 | 1,690 | 87 | 45 | 31 | 76 | 12 |
| Calcium-nickel phosphate-chromia promoted: | | | | | | | | | |
| 5 | 75 | 275 | 80 | 1,960 | 82 | 44 | 40 | 84 | |
| 6 | 75 | 275 | 97 | 2,040 | 88 | 40 | 41 | 81 | |
| 7 | 73 | 275 | 115 | 2,070 | 95 | 37 | 44 | 81 | 4 |

EXAMPLE II

The procedure of Example I was repeated, using a feed hydrocarbon stock which was principally 2-methyl butane (isopentane). Results are summarized in Table II, showing improved conversion and selectivity to isoprene and isoamylenes.

TABLE II

| Run Number | Temp., °C. | GHSV | | | | | Percent conversion | Selectivity | |
|---|---|---|---|---|---|---|---|---|---|
| | | Isopentane | Air | N₂ | Cl₂ | Steam | | Isoamylenes | Isoprene |
| Reactor with inert support: | | | | | | | | | |
| 8 | 550 | 64 | | 270 | | 1,600 | Trace | 0 | 0 |
| 9 | 550 | 59 | | 255 | 14 | 1,600 | 20.5 | 55.9 | 7.0 |
| Calcium-nickel phosphate-chromia promoted: | | | | | | | | | |
| 10 | 550 | 58 | | 240 | | 1,970 | Trace | 0 | 0 |
| 11 | 565 | 69 | 275 | | 112 | 1,470 | 79.0 | 32.8 | 21.2 |
| 12 | 600 | 64 | | 292 | 75 | 1,220 | 61.9 | 62.2 | 21.5 |
| 13 | 600 | 61 | | 315 | 112 | 1,425 | 78.0 | 39.0 | 29.8 |

We claim:
1. A process for the dehydrogenating aliphatic hydrocarbons of from four to six carbon atoms which comprises contacting a mixture of the hydrocarbons and chlorine in the ratio of from 0.1 to 2.0 moles of chlorine per mole of hydrocarbon with a catalyst of calcium-nickel phosphate promoted with a minor amount of chromia at a temperature of from 450° to 675° C.

2. The process of claim 1, wherein the atomic ratio of calcium to nickel in the catalyst is from 7.5 to 9.2 atoms of calcium per atom of nickel.

3. The process of claim 1, wherein an inert diluent is added to the mixture of chlorine and hydrocarbons.

4. The process of claim 3, wherein the inert diluent is steam, or nitrogen, or mixtures of these materials.

5. The process of claim 1, wherein the aliphatic hydrocarbons consist primarily of butanes.

6. The process of claim 1, wherein the aliphatic hydrocarbons consist primarily of 2-methyl butane.

* * * * *